United States Patent [19]
Sargent

[11] Patent Number: 5,106,112
[45] Date of Patent: Apr. 21, 1992

[54] SKI EQUIPMENT TRANSPORT DEVICE

[75] Inventor: Joan Sargent, Chattanooga, Tenn.

[73] Assignee: PortaSport, Inc., Chattanooga, Tenn.

[21] Appl. No.: 563,460

[22] Filed: Aug. 7, 1990

[51] Int. Cl.$^5$ .......................... B62B 1/12; B62B 1/14
[52] U.S. Cl. .......................... 280/40; 280/655;
280/47.19; 280/47.26; 280/47.28; 280/814;
224/917; 248/129
[58] Field of Search .............. 280/809, 814, 39, 40,
280/645, 646, 652, 655, 641, 47.315, 47.18,
47.19, 47.26, 47.28, 47.29, DIG. 6, 42;
224/42.03 A, 324, 917; 211/70.2, 70.5; 294/147;
248/98, 129

[56] References Cited

U.S. PATENT DOCUMENTS

| | | | |
|---|---|---|---|
| 2,262,298 | 11/1941 | Procter | 280/47.19 |
| 2,551,009 | 5/1951 | Kaltenbach | 280/47.19 |
| 2,754,130 | 7/1956 | Procter | 280/47.23 |
| 2,957,700 | 10/1960 | Beaurline | 211/70.2 X |
| 3,504,921 | 4/1970 | Osmond | 280/8 |
| 3,865,392 | 2/1975 | Hartway | 280/35 |
| 4,033,460 | 7/1977 | Alexandre | 211/70.5 |
| 4,087,102 | 5/1978 | Sprague | 280/40 X |
| 4,114,915 | 9/1978 | Lello et al. | 280/47.19 |
| 4,190,166 | 2/1980 | Allsop | 211/70.5 X |
| 4,221,402 | 9/1980 | Kazmark | 280/659 |
| 4,248,365 | 2/1981 | Jacobs | 280/814 X |
| 4,248,453 | 2/1981 | Stark | 280/655 |
| 4,268,050 | 5/1981 | Kennedy, Sr. | 280/38 |
| 4,269,435 | 5/1981 | Jaruenkyla et al. | 280/814 |
| 4,310,190 | 1/1982 | Schuetzeberg et al. | 280/814 X |
| 4,358,137 | 11/1982 | Gramm | 280/814 |
| 4,431,211 | 2/1984 | Carrigan | 280/655 |
| 4,486,027 | 12/1984 | Carrigan | 280/655 |
| 4,620,722 | 11/1986 | Dunn | 280/814 |
| 4,681,341 | 7/1987 | Lai | 280/646 |
| 4,732,283 | 3/1988 | Schmidt | 211/70.5 |
| 4,785,980 | 11/1988 | Redick | 224/42.03 A |
| 4,842,289 | 6/1989 | Samuels | 280/814 X |
| 4,848,782 | 7/1989 | Schmidt | 280/814 X |
| 4,856,811 | 8/1989 | Bressler et al. | 280/814 X |
| 4,896,897 | 1/1990 | Wilhelm | 280/655 |

FOREIGN PATENT DOCUMENTS

| | | | |
|---|---|---|---|
| 1466972 | 1/1967 | France | 280/814 |
| 2404446 | 6/1979 | France . | |
| 2563112 | 10/1985 | France . | |
| 786137 | 11/1957 | United Kingdom | 280/659 |

Primary Examiner—Andres Kashnikow
Assistant Examiner—Brian L. Johnson
Attorney, Agent, or Firm—Seidel, Gonda, Lavorgna & Monaco

[57] ABSTRACT

A ski equipment transport device includes a handle having a telescoping tubular frame which pulls out of a base member. A top keeper is clasped on to the handle between the opposite sides of the telescoping portions thereof and is attached thereto by a snap fit. A notch is provided on the top keeper for accepting and supporting skis. A strap fastened to one end of the top keeper hooks on to the keeper at the opposite end for retaining the skis. Slots or openings are provided within the base for accepting the butt end of the skis and the points of the ski poles. A wheel assembly is attached to the base so that the device is able to support itself in an upright position when fully loaded. The wheel assembly is at least partially removable from the base to permit the device to be positioned in an equipment locker.

17 Claims, 4 Drawing Sheets

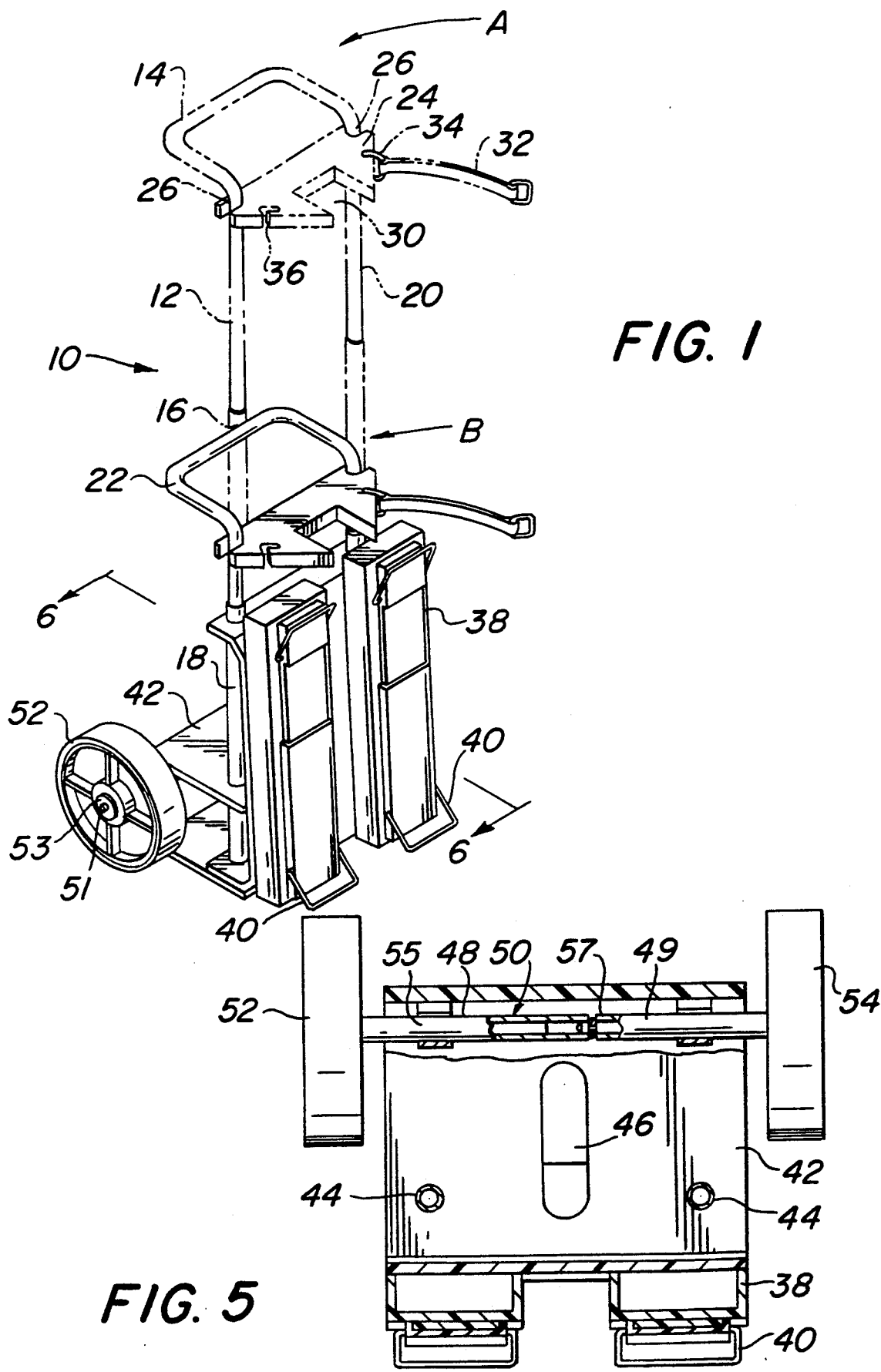

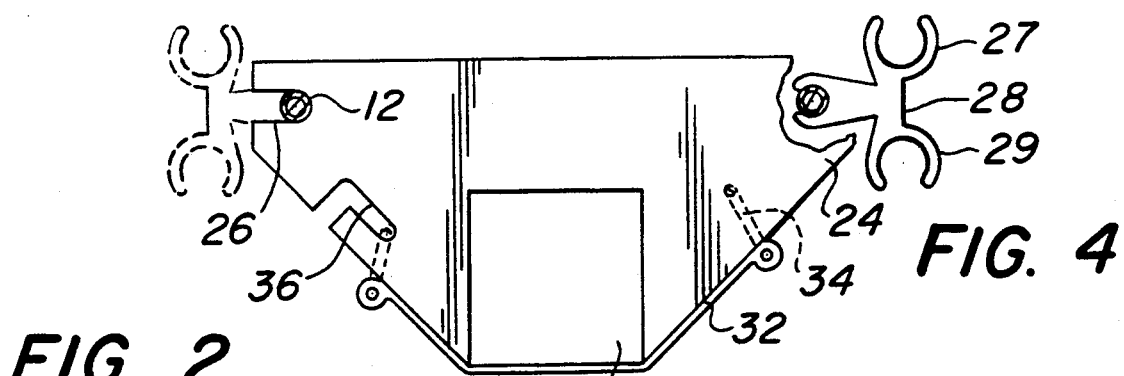
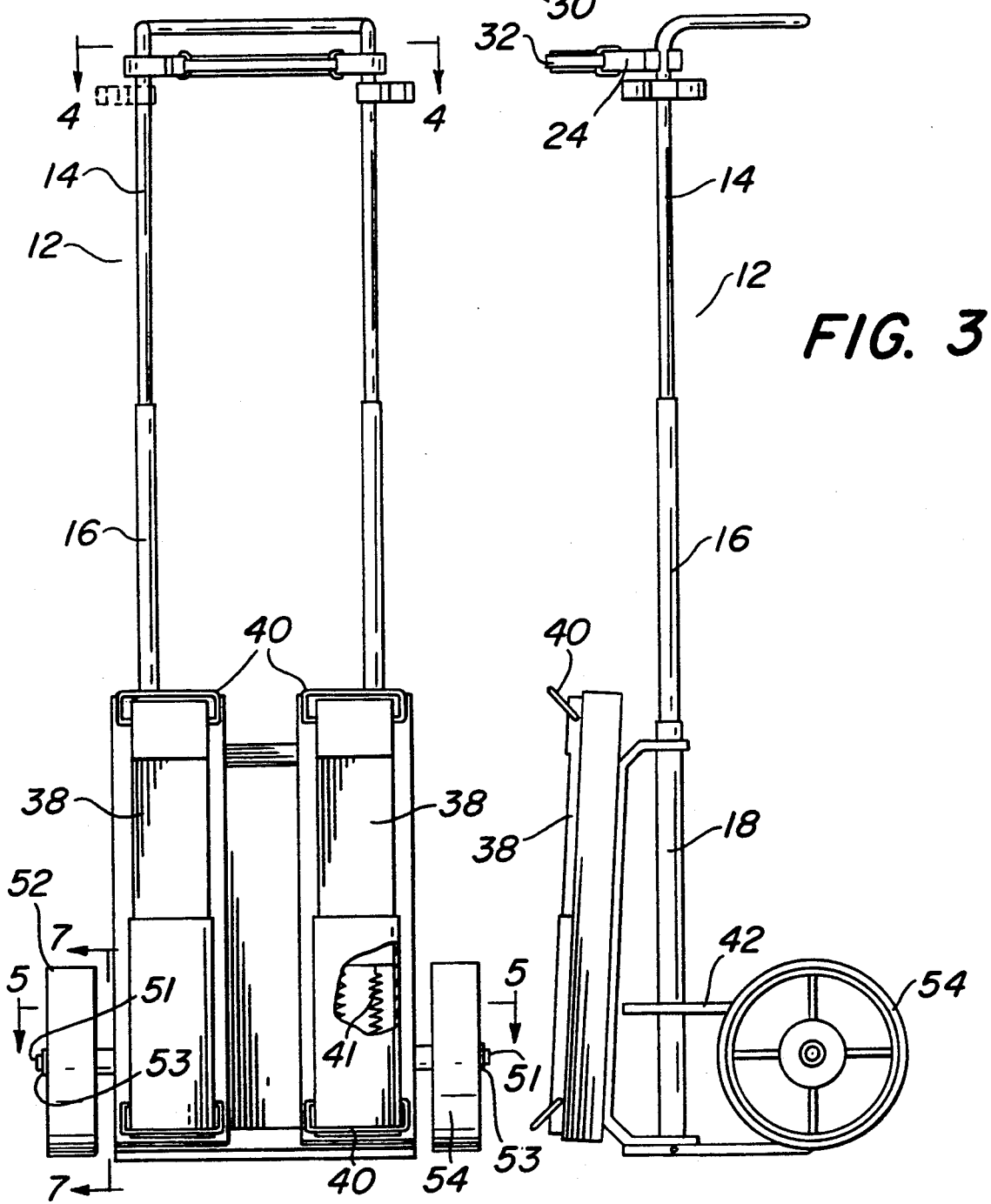

SKI EQUIPMENT TRANSPORT DEVICE

FIELD OF THE INVENTION

The present invention pertains to a transportation device, in particular, a device for the transporting of ski equipment.

BACKGROUND OF THE INVENTION

A number of devices have been developed for the transporting of various items such as ski equipment, luggage and golf clubs. Often these devices are bulky and cannot be reduced to a size where the device can be conveniently stored. In the case of transporting ski equipment, the prior devices are particularly bulky because they are normally as long as the skis so that they can efficiently balance the skis. Another problem is that the prior ski transport devices cannot normally be reduced to a size that may be fit into a ski locker of the type that is typically available for storage of personal items at most ski lodges. The result is that the transport device must be left out unattended, increasing the risk of theft.

A number of transport devices for various articles are collapsible, including telescoping handles and the like. Other known transport devices are designed to have wheels to make transport easy and have folding axles for purposes of allowing further reduction in size when collapsed.

It is an object of the present invention to provide a transport device for ski equipment which is collapsible and which can stand upright when it is fully loaded.

SUMMARY OF THE INVENTION

The present invention is directed to a ski equipment transport device in the form of a cart having wheels thereon. The device includes a handle having a telescoping tubular frame which pulls out of a base member. A top keeper is provided between the opposite sides of the telescoping handle and is attached thereto by a snap fit around the tubes. A notch is provided on the top keeper for accepting and supporting skis and ski poles. A strap fastened at one end to the top keeper hooks onto the keeper at the opposite end and secures the skis to the top keeper. Clasps can be snapped onto a portion of the handle to hold ski poles. Slots or openings may be provided within the base for accepting the butt end of the skis and the points of the ski poles. A wheel assembly is attached to a base. The wheel assembly includes an axle having a removable portion and a fixed portion. The removable portion permits one wheel to be removed from the base so that the width of the device is reduced for placement in a locker or the like. The wheels are attached high enough on the base so that the device can stand independently in an upright position. A second embodiment includes at least one wheel attached to the base by a folding axle that, when folded, stabilizes the cart to stand in an upright position. Boot holders can be attached to the base in either embodiment.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 is a perspective view of a portable ski equipment transport device embodying the features of the present invention;

FIG. 2 is a front plan view thereof;

FIG. 3 is a side plan view thereof;

FIG. 4 is a fragmentary horizontal sectional view thereof taken along line 4—4 in FIG. 2;

FIG. 5 is a fragmentary horizontal sectional view thereof taken along line 5—5 in FIG. 2;

DETAILED DESCRIPTION OF THE PREFERRED EMBODIMENTS

Figure 6:
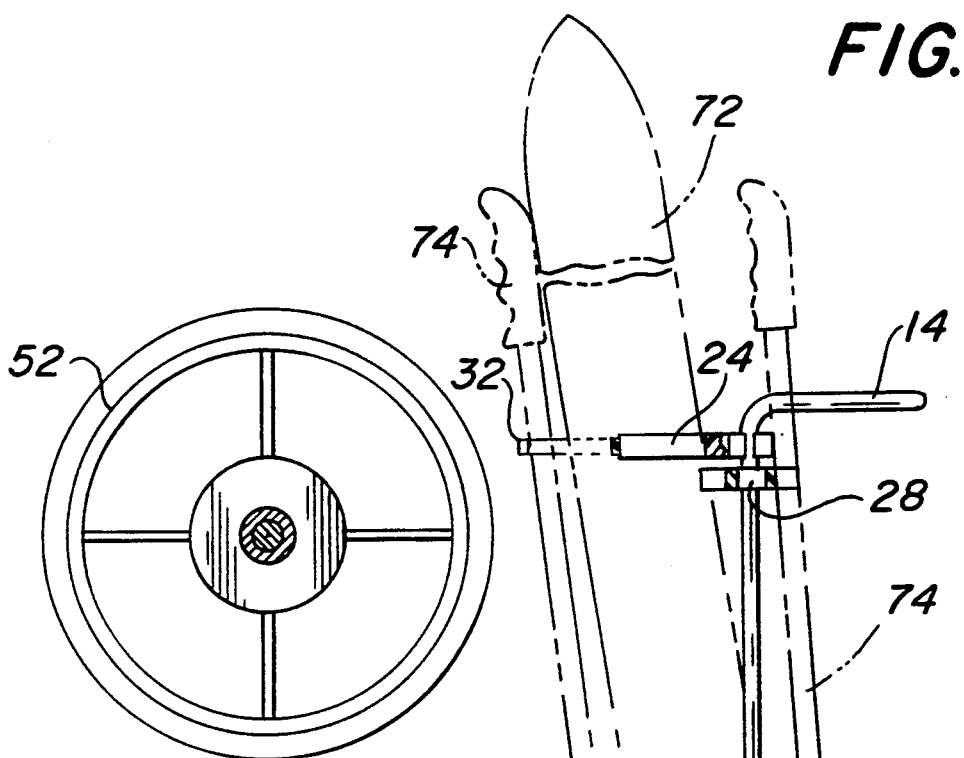
FIG. 6 is a fragmentary vertical sectional view thereof taken along line 6—6 in FIG. 1.
Figure 7:
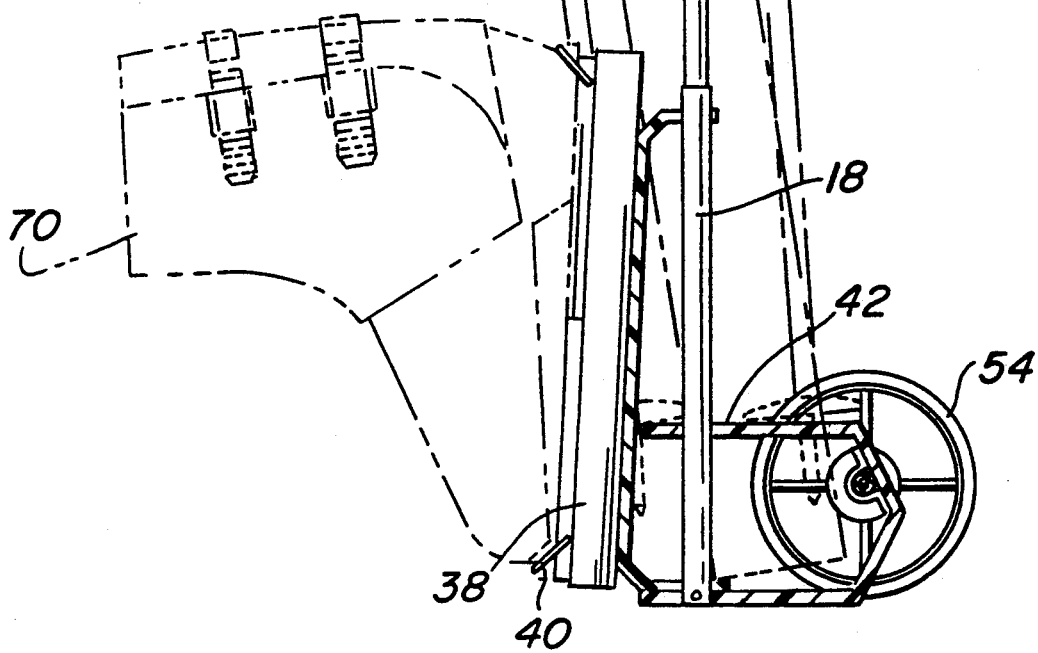
FIG. 7 is a fragmentary vertical sectional view thereof taken along line 7—7 in FIG. 2.

FIG. 1 illustrates a ski equipment transport device indicated generally by the numeral 10. The device 10 comprises a tubular handle 12 having two sides, each side having three portions 14, 16 and 18 which telescope within one another. The top portion 14 of the handle 12 is generally U-shaped and curved at the end to form the grasping section 20. The middle portion 16 of the handle 12 has an inside diameter slightly greater than the outside diameter of the top portion 14. The middle portion surrounds the legs of the U-shaped top portion 14. The top end of the middle portion 16 is tapered and the bottom end of top portion 14 is expanded so that these ends interengage one another and lock in the extended position. The lower portion 18 of the handle 14 has an inside diameter that is slightly greater than the outside diameter of the middle portion 16. The lower portion 18 is also tapered at its upper end so that the middle 16 and lower 18 portion interengage and lock in the extended position. The tapering at the ends of the middle 16 and lower 18 portions of the handle prevent the tubing from sliding apart when the handle 12 is in its fully extended position A (shown by dotted lines in FIG. 1). Also the interengaging tapers are intended to maintain the handle in the extended position. When the handle 12 is in its collapsed position B (shown by solid lines in FIG. 1), the three pieces of tubing slide together so that substantially only the grasping portion 20 of the handle 14 is exposed above the top of the lower portion 18. Other means of expanding and locking a telescoping handle or the like are known and are contemplated as being applicable to the present invention.

A top keeper 24 as shown in FIG. 4 forms a lateral extension to the upper portion-14 of the handle 12 directly beneath its grasping section 20. Top keeper 24 acts as a holding means for the ski equipment. The top keeper 24 can be attached to any part of the handle 12 but is preferably attached to the upper portion 14. The top keeper 24 can be made from a polycarbonate polymer, a polypropylene plastic or any other material which can be molded as desired. The top keeper 24 snaps onto the two sides of the upper portion 14 of the handle 12 by means of clasping ends 26. A notch 30 is provided on one side of the top keeper 24 substantially midway between each clasping end 26 for retaining the upper portion of a pair of skis and ski poles. The notch 30 preferably has a square shape to receive the ski equipment therein (FIG. 1). A strap 32 is secured to the top keeper 24 on one side of the notch 30 at position 34. Strap 32 is preferably made of rubber or some other flexible or elastic material. On the opposite side of notch 30 from the attachment 34 of strap 32 is a receiving opening 36 for connecting the free end of strap 32 to the top keeper 24 Thus strap 32 will retain the ski equipment within the notch 30. The strap 32 and receiving opening 36 combination may be modified as desired to include a buckle, hook or VELCRO (registered trademark of Velcro USA, Inc.) closure means or the like.

The top keeper 24 has clasping ends 26 which are U-shaped and made to have a spring like quality such that they are able to snap onto the opposite sides of the handle 12. The elasticity in the clasping ends 26 causes them to conform to the outer surface of the handle 12 to maintain the position of the keeper 24. Likewise the top keeper 24 could be attached to any device having a similar handle, such as a luggage cart or a golf cart. As with the present device 10, the clasping ends 26 of the top keeper 24 would move apart to accommodate the handle and then conform to the handle's outer surface to form a tight fit. This would adapt the cart to carry ski equipment.

A clasp 28 can be snapped onto either side of handle 12 to hold the top portion of ski poles. The clasp 28, as shown in FIG. 4, has three U-shaped portions. One U-shaped portion snaps onto the handle 12 of the device 10. The two other portions 29 receive the upper portion of a ski pole. Each of the U-shaped portions are flexible and move apart to grip the handle 12 or ski pole. The clasp 28 is preferably positioned directly beneath the top keeper 24 with the two U-shaped portions 29 to receive the ski poles facing outward. The positioning of the clasp 28 is left to the convenience of the user. The determination as to which side of the handle to place the clasp will usually be based on whether the user is left handed or right handed.

A conventional boot holder 38, which is well known in the prior art such as that manufactured by Allsop, can be connected to the lower portion 18 of the handle 12. On each end of each boot holder 38 is attached a pivotable bar 40. The boot holder 38 is spring loaded 41 (see FIG. 2) so as to be adjustable to accommodate any size boot. Bars 40 hold each end of the boot onto the base portion 39 of the boot holders 38.

The base 42 of the device 10 is adapted to receive the butt ends of the skis and serves as the support for the handle 12 and the wheels 52, 54. Base 42 in the present embodiment can be made from a polycarbonate polymer, a polypropylene plastic or any other suitable moldable material. Base 42, as best illustrated in FIG. 5, is attached to the handle 12 of the device 10 by placing the lower portion 18 of the handle 12 through cups 44. The base 42 is also provided with ski cup 46 for supporting the butt end of the skis. Cups (not shown) may also be provided to receive the points of the ski poles.

On the under side of the base 42 is a longitudinal gap 48 for receiving the axle 50 of a wheel assembly 49 which connects to two wheels 52, 54. The wheel assembly 49 is mounted high enough on the base 42 so that the wheels 52, 54 do not touch the ground when the device 10 is in a standing position (See FIG. 3). As shown in FIG. 1, the wheels 52, 54 are mounted on the axle 50 by means of a press cap nut 51 and washer 53. The axle 50 includes a fixed portion 55 and a removable portion 57. The fixed portion 55 of the axle 50 is secured to the base 42. The end of the removable portion 57 snaps into the fixed portion 55 to retain portion 57 on the base 42. When the device 10 is to be stored, the removable portion 57 of the axle 50 and the wheel 54 attached thereto can be removed by sliding the removable portion 57 of the axle 50 out of gap 48 in the base 42.

As shown in FIGS. 2 and 3, both wheels 52, 54 are positioned above the bottom of the base 42. This arrangement permits the device 10 to stand in an upright position when wheel 54 is removed. Removal of wheel 54 shortens the width of the base. This permits the device 10 to be stored in a locker when not in use while providing maximum stability when rolling the ski equipment. Portion 55 of the axle 50 may also be removable for this purpose, if desired.

Figure 8:
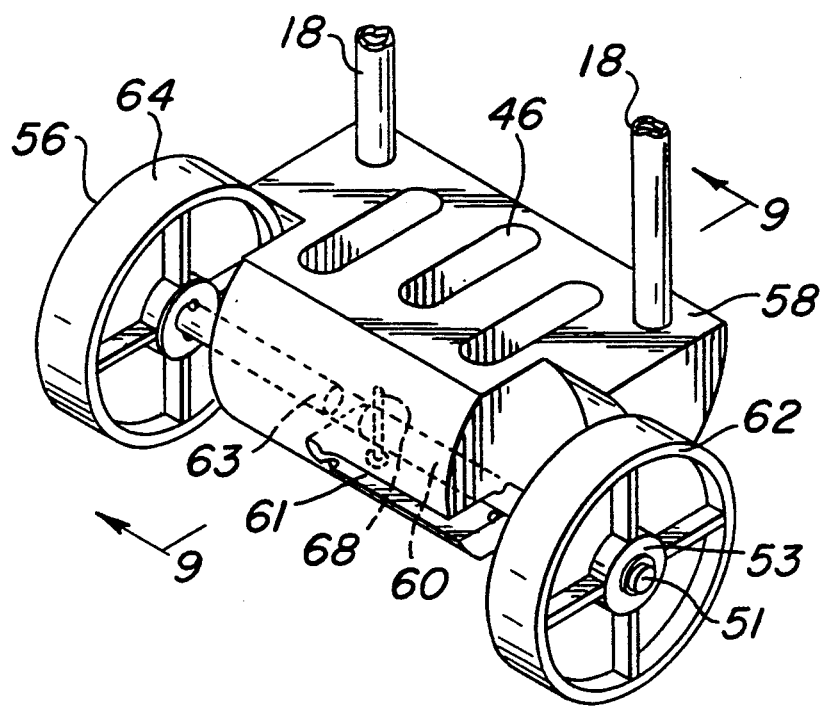
FIG. 8 is a perspective view of a wheel base forming a portion of a second embodiment of the present invention.
Figure 9:
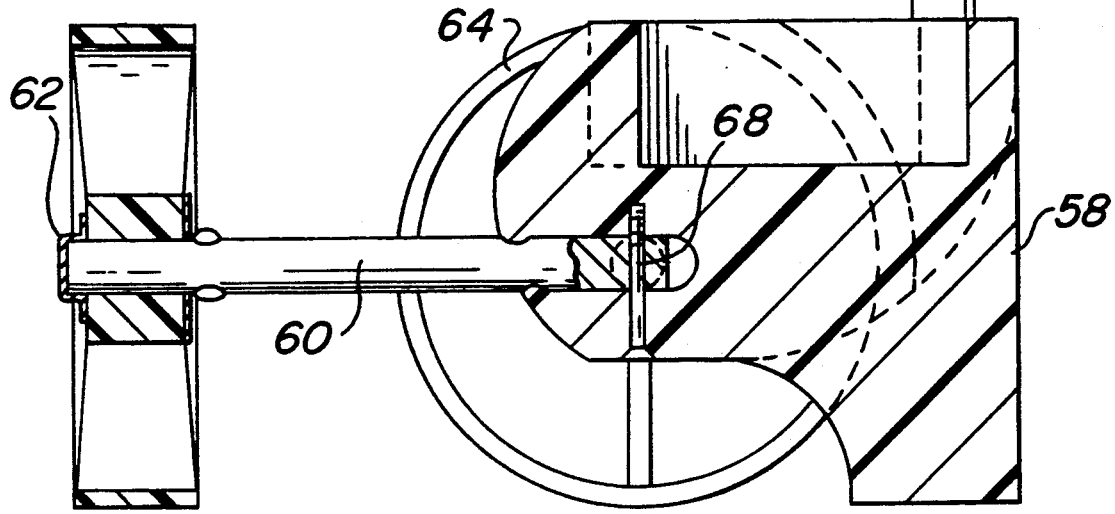
FIG. 9 is a fragmentary vertical sectional view thereof taken along line 9—9 in FIG. 8.

A second type wheel assembly 56 is illustrated in FIGS. 8 and 9. FIG. 8 shows a lower portion of a ski transport device 10' having a base 58 similar to the previous embodiment in that it contacts the floor when in the upright position. The wheel assembly 56 comprises a folding axle 60 connected to one wheel 62 and supported in a channel 61 in the front of the base 58. The opposite wheel 64 is supported by a fixed axle 63. The wheels 62, 64 are made of a plastic such as polypropylene and are fastened to folding axle 60 and fixed axle 63 by suitable means such as that described above.

The folding axle 60 is secured in the base 58 at one end by pin 68. The pin 68 is located slightly off center from the midpoint of the base 58. The pin 68 forms a pivot such that the folding axle 60 may be removed from the channel 61 and the wheel 62 positioned in the front of the base 58 so that it is perpendicular to the other wheel 64 (FIG. 9). The folding axle 60 in this position is perpendicular to the axle 63. By having the folding axle 60, the device 10' is further supported in the upright position when it is fully loaded. Also, this folding axle reduces the width of the base for purposes of locker storage. When the axle 60 is unfolded, the wheels 62, 64 are extended an equal distance from the base 58 to provide stability.

A fully loaded ski equipment transport device 10 is illustrated in FIG. 6. Ski boots 70 are placed in boot holder 38 with metal bars 40 attached to each end thereof. Skis 72 are inserted into the device 10 so that their bottom sides face one another. The skis are also inserted into slot 30 and are retained therein by the strap 32. The butt end of the skis 72 and the tips of the ski poles 74 are placed in the cup 46 in the base 42. The ski poles 74 may be inserted into slot 30 adjacent the skis and also be retained therein by strap 32. Alternatively, ski poles 74 may be retained by clasp 28 which is attached to the U-shaped portion 29. As can be seen in FIG. 6, when the device 10 is fully loaded it can support itself in a standing position.

The present invention may be embodied in other specific forms without departing from the spirit or essential attributes thereof and, accordingly, reference should be made to the appended claims, rather than to the foregoing specification, as indicating the scope of the invention.

I claim:

1. A ski equipment transport device comprising: a collapsible handle having a grasping portion; a top keeper forming a lateral extension to said handle, said keeper having clasping means which removably snaps onto said handle, said keeper having a notch for receiving ski equipment; a strap connected to said keeper on one side of said notch; attaching means for removable attaching said strap to said keeper on the opposite side of said notch, said attaching means for securing ski equipment in said notch; a base, said handle attached to said base, said base having a cup for receiving ski equipment therein; and a wheel assembly attached to the base.

2. A device according to claim 1 wherein the wheel assembly comprises two wheels positioned on either side of said base, a wheel axle positioned in said base, said axle having a fixed portion connected to one wheel and to said base, said axle having a movable portion connected at one end to said base and connected to the second wheel on the other end, said wheel assembly positioned on said base so that said device can stand in an upright position and said second wheel is movable away from said base.

3. A device according to claim 2 wherein said movable portion of said axle is selectively removable from the base.

4. A device according to claim 2 wherein said movable portion of said axle is connected to said base at a pivot, said movable portion pivots to permit said second wheel to be positioned perpendicular to said first wheel.

5. A ski equipment transport device comprising: a collapsible handle; a base for supporting the device in an upright position, said base having at least one opening for receiving said handle, said base having a cup for receiving ski equipment; and a wheel assembly having two wheels positioned on either side of a wheel axle, said wheel axle attached to said base, said axle having a fixed portion connected to one wheel and a removable portion which snaps into said fixed portion, said removable portion connected to said second wheel and being removable along with said wheel from said base, said wheel assembly positioned on said base so that said base supports the device in an upright position, said movable portion of said axle is connected to said base at a pivot, said movable portion pivots to permit said second wheel to be positioned perpendicular to said first wheel.

6. A device according to claim 5 further comprising a top keeper for securing ski equipment to the handle, said keeper having clasping means which snaps onto said handle.

7. A device according to claim 6 wherein said top keeper has a notch for retaining ski equipment and means connected to said keeper adjacent said notch for securing the ski equipment in said notch.

8. A device according to claim 7 wherein said notch of said top keeper is square-shaped.

9. A device according to claim 7 wherein said securing means is a strap made of an elastic material which is permanently attached to one side of said notch and having means for selectively attaching the other side of said strap to said keeper.

10. A device according to claim 7 wherein said handle is made of telescoping tubing.

11. A device according to claim 10 wherein said handle is U-shaped.

12. A device according to claim 11 further comprising a clasp having means for snapping onto said handle and two U-shaped portions adapted to receive ski poles.

13. A ski equipment transport device comprising: a telescoping U-shaped handle having the bight of the U-shape forming a grasping section, said handle is actuatable to two positions, a first position in which said handle is in a collapsed state and a second position in which said handle is in an extended state; a top keeper forming a lateral extension between opposite sides of said handle, said keeper having clasping means on opposing ends which snaps onto the side legs of the U-shaped handle, said keeper having a notch between said clasping means for receiving ski equipment; a strap connected to said keeper on one side of said notch; attaching means for removably attaching said strap to said keeper on the opposite side of said notch from said connection of said strap to said top keeper, said attaching means for securing ski equipment in said notch; a base, said handle attached to said base, said base having a cup for receiving one end of ski equipment therein; and a wheel assembly having two wheels positioned on either side of said base, a wheel axle attached to said base, said axle having a fixed portion connected to one wheel and a removable portion which snaps into said fixed portion of said axle, said removable portion connected to said second wheel such that said second wheel is removable along with said removable portion.

14. A device according to claim 13 wherein said wheel assembly is positioned high enough on said base so that said device can stand in an upright position with said wheel assembly removed from a ground surface.

15. A top keeper for retaining ski equipment on a collapsible cart of the type having a telescoping handle made of at lest two pieces of tubing each positioned parallel to one another, said handle actuatable to a first collapsed position and a second extended position, at least one end of said handle attached to a base, and wheels attached to the base, said wheels for rolling the cart and ski equipment supported on the base, said keeper comprising: a body; clasping means on said body for removably snapping onto said handle; a notch positioned on said body for receiving ski equipment therein; strap means connected to said body on one side of said notch; attaching means for removable attaching said strap means to the other side of said notch for securing said strap means to said body and for retaining the ski equipment in said notch.

16. The keeper according to claim 15 wherein said strap means is made of an elastic material.

17. The keeper according to claim 15 wherein said clasping means connects the body to both pieces of the handle of the cart.

* * * * *